United States Patent
Gudipati et al.

(10) Patent No.: US 10,958,509 B2
(45) Date of Patent: Mar. 23, 2021

(54) PROVIDING A NEW SERVER ALARM CONFIGURATION BASED ON THE CORRELATION OF SERVER ALARMS FOR VARYING METRICS OF MONITORED SERVERS

(71) Applicant: CA, Inc., New York, NY (US)

(72) Inventors: Balavenkata Ajay Kumar Gudipati, Andhra Pradesh (IN); Rajat Kumar Mishra, Telangana (IN); Sheenam Gupta, Telangana (IN); Tribhuwan Narain Singh Yadav, Telangana (IN)

(73) Assignee: CA, Inc., New York, NY (US)

( * ) Notice: Subject to any disclaimer, the term of this patent is extended or adjusted under 35 U.S.C. 154(b) by 94 days.

(21) Appl. No.: 16/157,241

(22) Filed: Oct. 11, 2018

(65) Prior Publication Data
US 2020/0119978 A1    Apr. 16, 2020

(51) Int. Cl.
*G06F 15/16*     (2006.01)
*H04L 12/24*    (2006.01)
*H04L 12/26*    (2006.01)

(52) U.S. Cl.
CPC ...... *H04L 41/0686* (2013.01); *H04L 41/0631* (2013.01); *H04L 41/0681* (2013.01); *H04L 43/16* (2013.01)

(58) Field of Classification Search
CPC ............. H04L 41/0686; H04L 41/0631; H04L 41/0681; H04L 43/16
(Continued)

(56) References Cited

U.S. PATENT DOCUMENTS

| 6,966,015 B2 * | 11/2005 | Steinberg | H04L 41/0609 714/26 |
| 2011/0264424 A1 * | 10/2011 | Miwa | G05B 23/0278 703/2 |

(Continued)

OTHER PUBLICATIONS

Nichols, Elizabeth, "Anomaly Detection for DevOps: 3 Types of Monitoring Tools," Metricly, published Mar. 28, 2016 [online], [retrieved on Oct. 11, 2018]. Retrieved from the Internet <url: https://www.metricly.com/3-types-anomaly-detection-monitoring-tools>.

(Continued)

*Primary Examiner* — David R Lazaro
*Assistant Examiner* — Mariegeorges A Henry
(74) *Attorney, Agent, or Firm* — Shook, Hardy & Bacon L.L.P.

(57) ABSTRACT

A method performed by a server processing computer for a plurality of monitored servers is provided. The method includes receiving a server alarm of a first type in response to one of a first set of server metrics, each of which includes a measure of a first property for the monitored servers, exceeding a first threshold. The method also includes receiving a server alarm of a second type in response to one of a second set of server metrics, each of which includes a measure of a second property for the monitored servers, exceeding a second threshold. The method includes determining a server alarm correlation between the received server alarm of the first type and the received server alarm of the second type, and generating a new server alarm configuration for a server alarm of the first type and/or the second type based on the server alarm correlation.

20 Claims, 5 Drawing Sheets

(58) Field of Classification Search
USPC .................................................. 709/224, 223
See application file for complete search history.

(56) References Cited

U.S. PATENT DOCUMENTS

| | | | |
|---|---|---|---|
| 2015/0288557 A1* | 10/2015 | Gates | G06F 11/3006 |
| | | | 714/37 |
| 2016/0182274 A1* | 6/2016 | Kiesekamp | H04L 41/069 |
| | | | 709/224 |
| 2020/0007405 A1* | 1/2020 | Chitalia | G06F 9/5077 |

OTHER PUBLICATIONS

Harper, Robert, "Understanding the Machine Learning in AIOps: Part 4," Moogsoft, published Mar. 6, 2018 [online], [retrieved on Oct. 11, 2018]. Retrieved from the Internet <url: https://www.moogsoft.com/blog/aiops/understanding-machine-learning-part-4/>.

* cited by examiner

PROVIDING A NEW SERVER ALARM CONFIGURATION BASED ON THE CORRELATION OF SERVER ALARMS FOR VARYING METRICS OF MONITORED SERVERS

BACKGROUND

The present disclosure relates to providing a new server alarm configuration based on the correlation of server alarms for varying metrics of monitored servers.

Distributed computing systems, sometimes also referred to as cloud computing systems, are used to provide services to electronic devices which may be operated by end users. In a cloud computing system, the resource architecture is hidden from the end user. The resource architecture can include computer servers, network non-volatile storage devices, computing devices, network routers, network gateways, wireless/wired network interface circuits, etc. Because services are deployed on a resource architecture which is hidden from end users, it can be managed, upgraded, replaced or otherwise changed by a system administrator (operator) without the end users being aware of or affected by the change.

System administrators are tasked with managing individual resources in the system, but their effectiveness is affected by their knowledge of the system and frequency and detail of their performing monitoring. Administrators may manually create event alerting rules which are triggered by conditions measured among the servers, and which generate alerts to the administrators and/or a network operations center. These semi-static alerting rules may lack sufficient sensitivity to variations between the operational loading and hardware configuration of different computing systems, and to changes over time in a computing system and surrounding environment.

SUMMARY

Some embodiments disclosed herein are directed to providing a new server alarm configuration based on the correlation of server alarms for varying metrics of monitored servers. Thus, in some embodiments, a method performed by a server processing computer for a number of monitored servers is provided. The method includes receiving a server alarm of a first type in response to at least one of a first set of server metrics exceeding a first threshold. According to some embodiments, each of the first set of server metrics includes a measure of a first property that has been measured for at least one of the number of monitored servers. The method also includes receiving a server alarm of a second type in response to at least one of a second set of server metrics exceeding a second threshold. In some embodiments, each of the second set of server metrics includes a measure of a second property that has been measured for at least one of the number of monitored servers. The method includes determining a server alarm correlation between the received server alarm of the first type and the received server alarm of the second type. The method also includes generating a new server alarm configuration for at least one of a server alarm of the first type and a server alarm of the second type based on the server alarm correlation.

It is noted that aspects described with respect to one embodiment disclosed herein may be incorporated in different embodiments although not specifically described relative thereto. That is, all embodiments and/or features of any embodiments can be combined in any way and/or combination. Moreover, methods, systems, and/or computer program products according to embodiments will be or become apparent to one with skill in the art upon review of the following drawings and detailed description. It is intended that all such additional methods, systems, and/or computer program products be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Like numbers refer to like elements throughout.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Distributed Computing System

Figure 1:
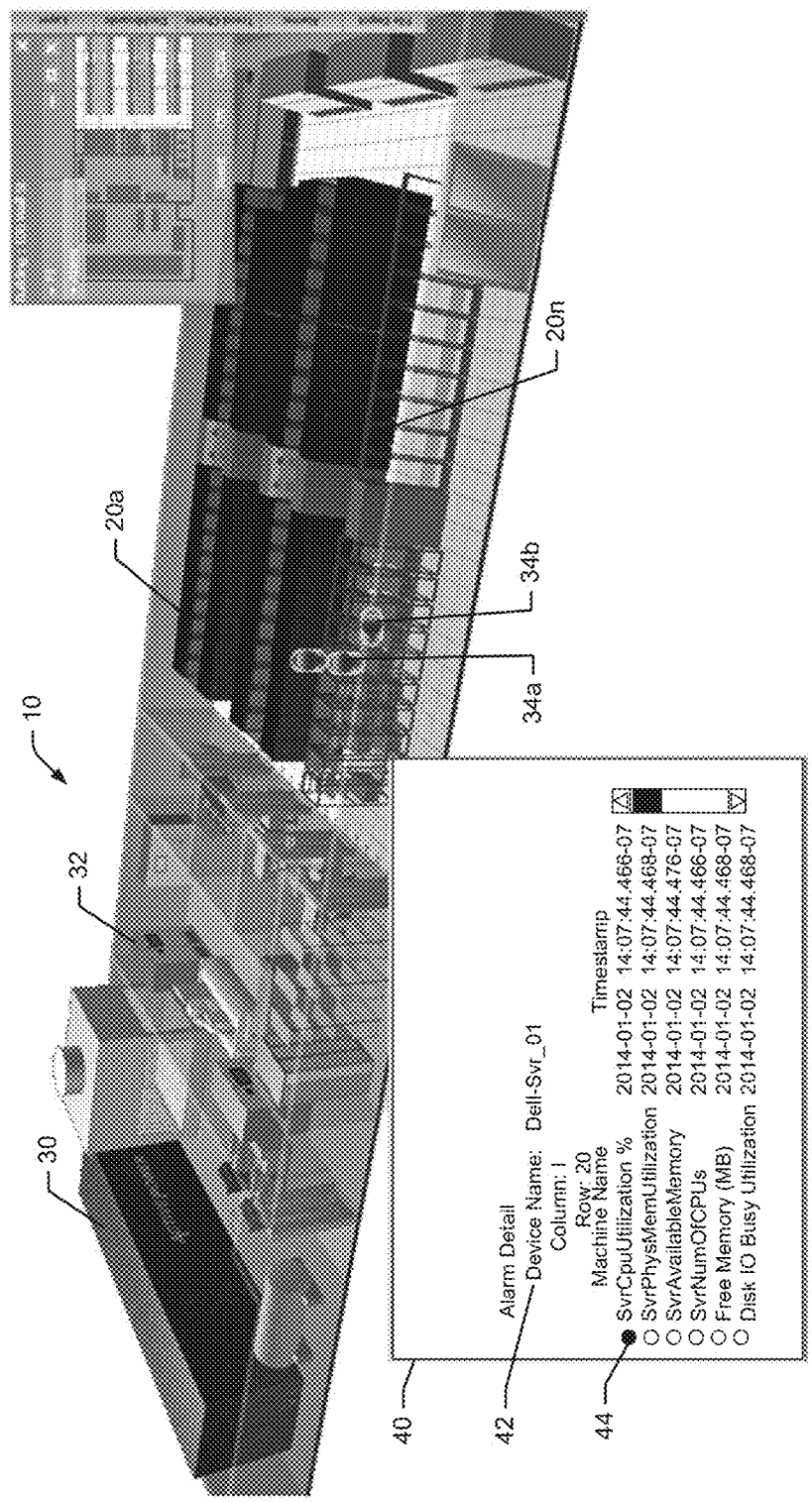
FIG. 1 is a pictorial illustration of a distributed computer system that is configured as a data center having monitored servers and a server processing computer configured according to some embodiments.

FIG. 1 is a diagram of a distributed computer system that is configured as a data center 10 according to some embodiments. The data center 10 can include hundreds or thousands of data servers which are mounted to physical racks 20a-20n arranged in rows for accessibility by operators. The data servers consume substantial amounts of electrical power from a power source 30, occupy physical rack storage space of the data center 10, and require cooling heat transfer by a cooling system 32 to remain within an acceptable operational temperature range. The electrical power, physical rack storage space, cooling, and other support systems are examples of infrastructure provided by the data center 10 to support operation of the data servers.

The data servers, network firewalls, network routers, network switches, software defined network (SDN) controllers, and other processing and network communication devices are example hardware resources in the data center 10. Software resources are other types of resources, which may include applications, operating systems, virtual machine hypervisors, etc. Although various embodiments are explained in the context of the data center 10, they are not limited thereto. Embodiments can be used with other types of computing systems, distributed computing systems, and/or other hardware and/or software resources that can be used in computing systems, including, but not limited to, desktop computers, network firewalls, network routers, network switches, SDN controllers, and other resources.

In accordance with some embodiments, the data center 10 includes, or is communicatively networked to, a server processing computer, which can also be mounted within one or more of the physical racks 20 or separate therefrom, and can operate according to various embodiments disclosed herein. The server processing computer performs operations related to providing a new server alarm configuration(s) based on the correlation of server alarms for varying metrics of the monitored servers. The server processing computer can be connected to servers, routers, SDN controllers, switches, and/or firewalls via a network. As such, the server processing computer can initiate remedial actions in response to receiving server alarms. For example, the server processing computer may offload communication traffic in existing network communication sessions, which are with user devices and are being processed by the resource, from the resource to at least one other resource of the distributed computing system in response to receiving a server alarm(s). The server processing computer may additionally, or alternatively, initiate as the remedial action, decreasing an amount of incoming website request messages being directed to the resource relative to being directed to at least one other resource of the distributed computing system. In some other embodiments, the remedial action includes the server processing computer communicating an alert message containing information identifying the occurrence of a rule-based server event and an identifier of the resource associated with the event, to an operator/user console display device.

The server processing computer may also display reports indicating performance metric values from performance measurements of resources of the data center 10. In the non-limiting example of FIG. 1, a report 40 is displayed on a display device of a data center terminal. The report 40 identifies the name 42 of one of the resources (e.g., data server "Dell-Srv_01"), and identifies utilization values that have been measured (i.e., as the performance metric values) for that resource while processing a software application. The utilization values displayed in the example report 40 of FIG. 1 are associated with operational properties of the servers and include server CPU utilization percentage, server physical memory utilization, server available memory, server number of CPUs, free memory, supply voltage associated with the monitored servers, throughput associated with the monitored servers, and/or disk input/output busy utilization. The report may further indicate if any of the resources are operating near defined limits (i.e., thresholds).

A pictorial illustration of the data center 10 may also be displayed on the console display device. The server processing computer may display graphical alarm indications 34a and 34b at particular locations of the racks where the data center operator may want to deploy further server devices and/or other resources, and/or to offload network traffic and/or processing tasks, based on information provided by the server processing computer according to one or more embodiments disclosed herein.

These and other operations are explained in further detail below after the following explanation of a distributed computing system in which the operations may be performed.

Figure 2:
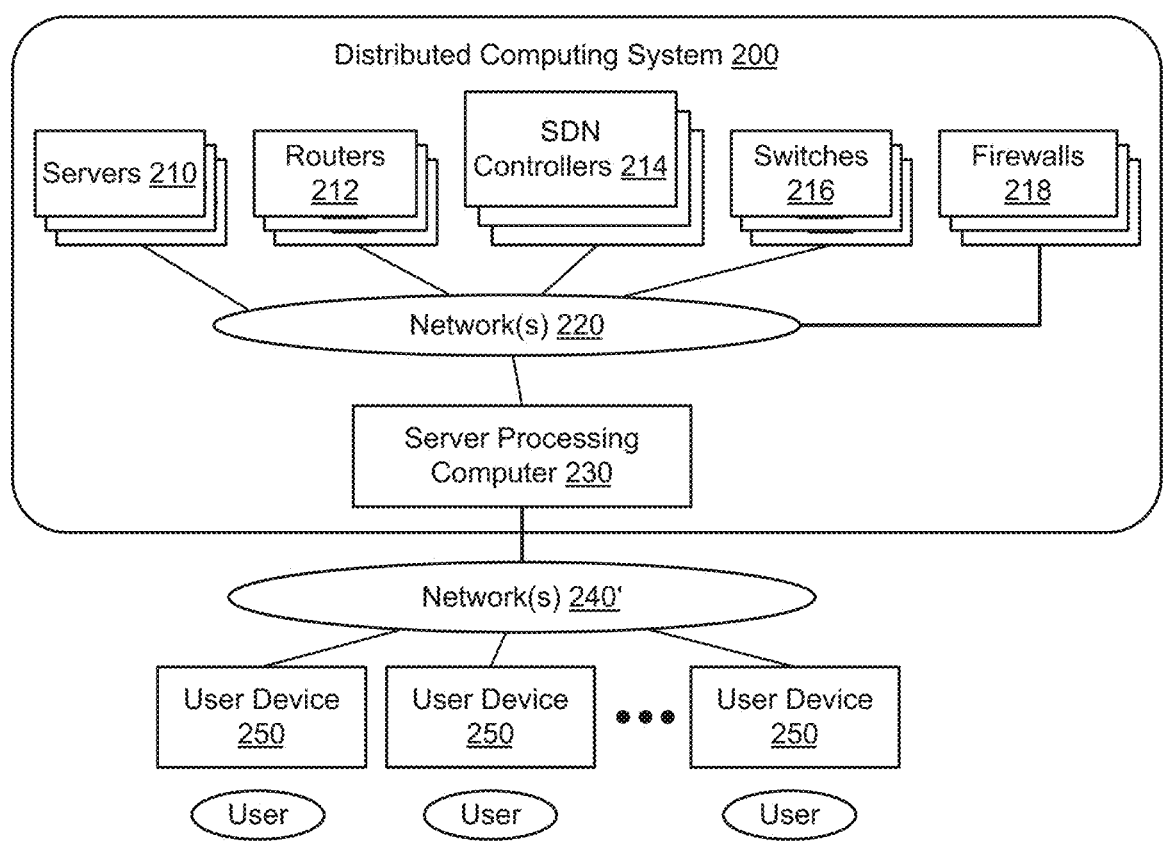
FIG. 2 is a block diagram of a server processing computer in a distributed computing system, according to some embodiments.

FIG. 2 is a block diagram of a distributed computing system 200 which may correspond to the data center of FIG. 1, and that is configured according to some embodiments. As illustrated in FIG. 2, the distributed computing system 200 includes a plurality of resource nodes (i.e., servers 210, routers 212, SDN Controllers 214, switches 216, and firewalls 218), a network 220 within the distributed computing system 200, and a server processing computer 230 connected to the plurality of resource nodes 210-218 via the network 220. During operation, the distributed computing system 200 can receive requests for processing via the external network 240 from electronic devices 250 operated by end-users.

The electronic devices 250 may include, but are not limited to, desktop computers, laptop computers, tablet computers, wireless mobile terminals (e.g., smart phones), gaming consoles, networked televisions with on-demand media request capability. The resource nodes may include servers 210 (e.g., network content servers such as Internet website servers, movie/television programming streaming servers, application program servers), network packet routers 212, SDN controllers 214, network communication switches 216, network communication firewalls 218, network storage devices (e.g., cloud data storage servers), network gateways, communication interfaces, program code processors, data memories, display devices, and/or peripheral devices. The resources may further include computer resources such as: processor(s) (e.g., central processing unit, CPU); network interface(s); memory device(s); data mass storage device(s) (e.g., disk drives, solid state nonvolatile memory, etc.); etc. For some distributed computing systems 200, the number of resource nodes can number more than one hundred or even more than one thousand.

The server processing computer 230 may operate to distribute individual requests that are received from the electronic devices 250 to particular ones of the resource nodes 210-218 which it selects for processing. The server processing computer 230 may select among the resource nodes 210-218 for distributing individual requests responsive to the present loading of the resource nodes 210-218 and signaling for various remedial actions, such as those discussed above. The loading may be determined based on the performance metric values measured for a resource, which may include processing resources, volatile memory resources, non-volatile mass storage resources, communication resources, and/or application resources that are utilized to process the requests. The server processing computer 230 may, for example, operate to distribute the requests responsive to the occurrence of server alarms associated with rule-based events, in accordance with various operations described below.

Providing New Server Alarm Configuration(s)

Figure 3:
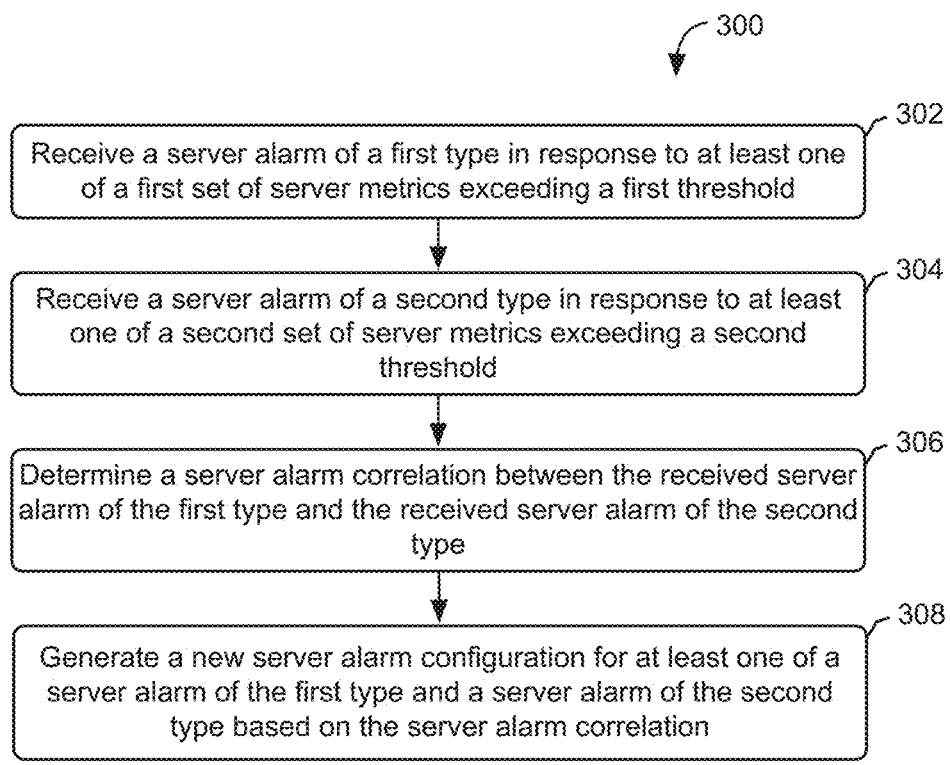
FIGS. 3 and 4 are flowcharts that illustrates operations by the server processing computer in accordance with some embodiments.
Figure 4:
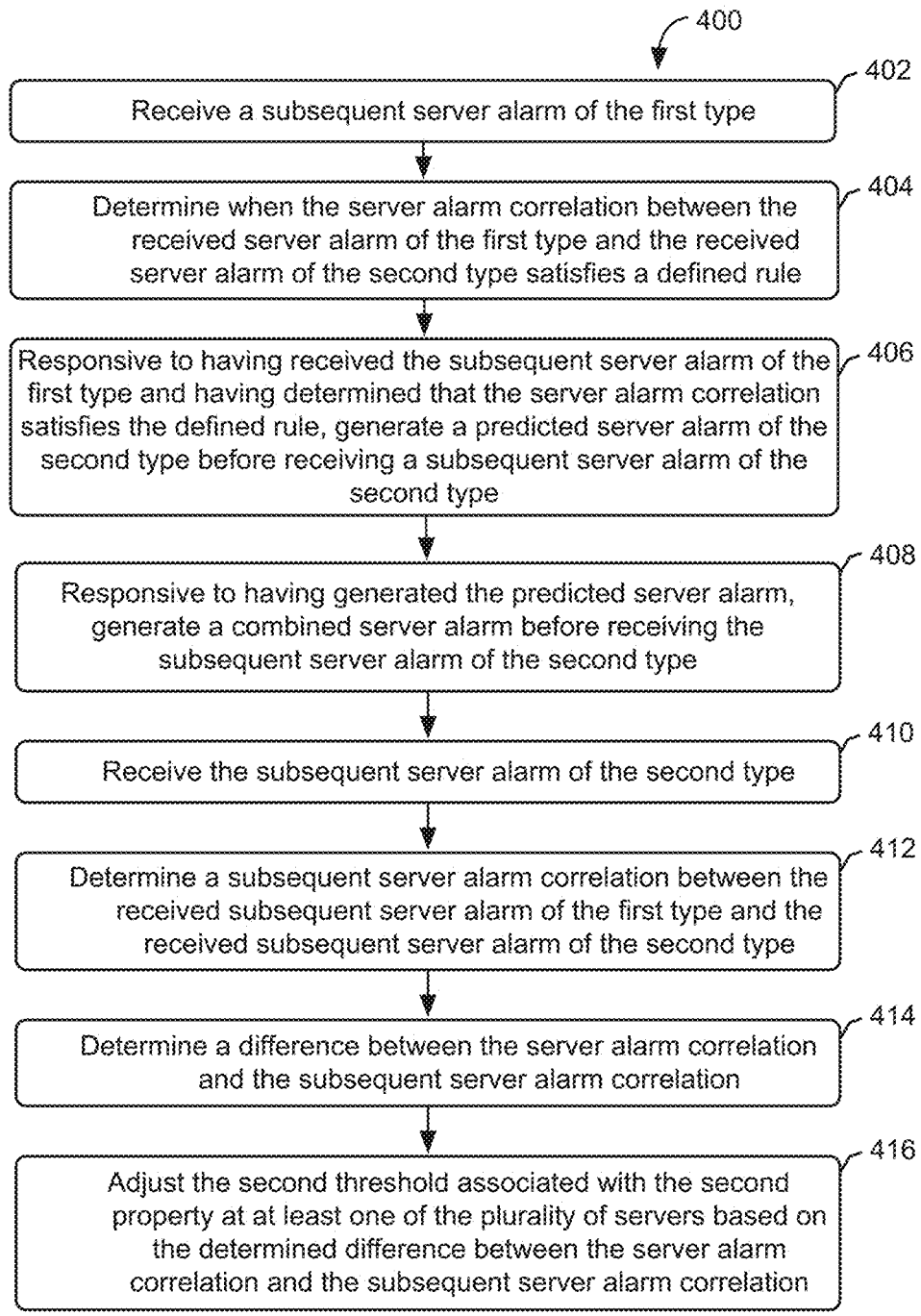

FIG. 3 illustrates a flowchart 300 of operations of a method performed by the server processing computer 230 for the plurality of monitored servers in the distributed computing system 200 illustrated in FIG. 2, according to some examples. FIG. 4 illustrates additional and/or more detailed embodiments of operations of the method illustrated in FIG. 3. The operations illustrated in the FIGS. 3 and 4 are discussed herein in conjunction with the graphs illustrated in FIG. 5. In this regard, before discussing the operations illustrated in FIGS. 3 and 4, some of the components of the graphs illustrated in FIG. 5 are first discussed.

Figure 5:
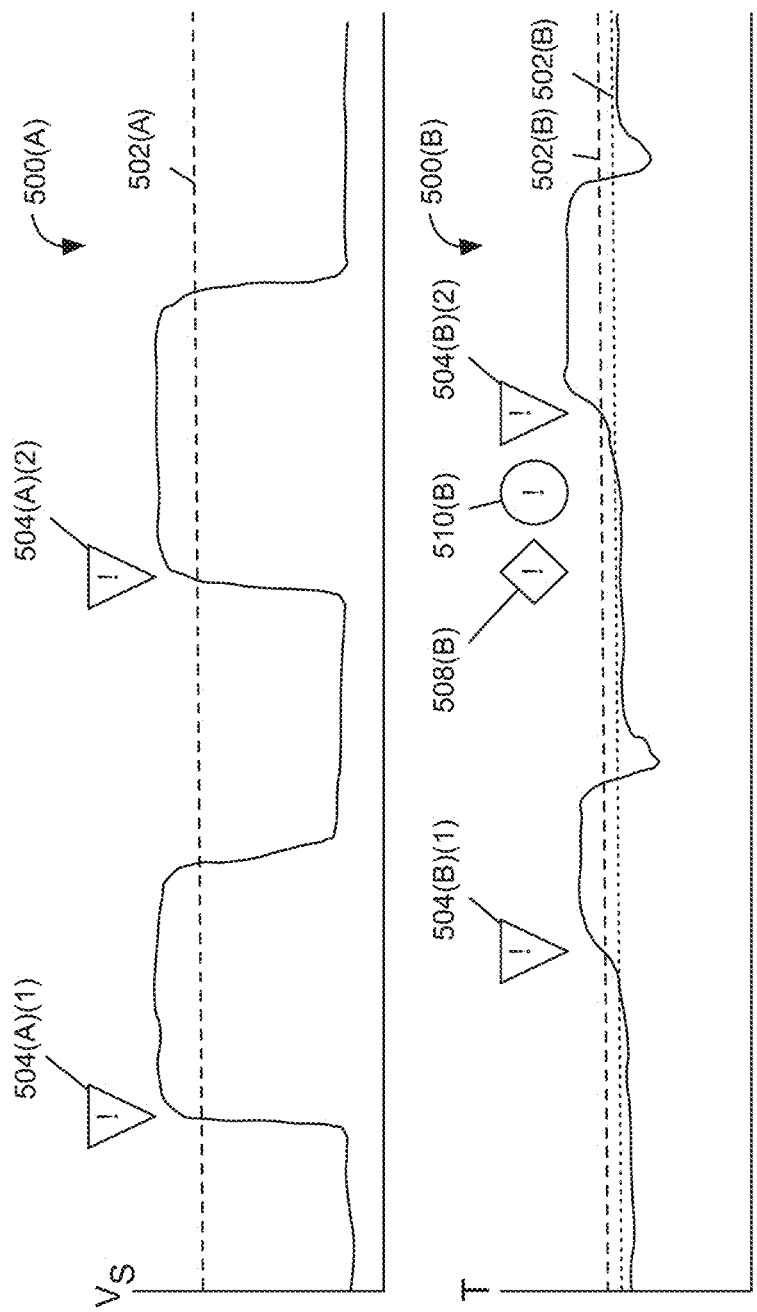
FIG. 5 is an illustration of graphs associated with the server alarms discussed with regard to inventive concepts discussed herein.

FIG. 5 illustrates two graphs 500(A) and 500(B) which may be displayed to an operator/user console display device and/or recorded internally in the server processing computer 230. As illustrated, the upper graph 500(A) in FIG. 5 illustrates a supply voltage ($V_S$) level recorded for a rack 20 of servers in the data center 10. The dotted line in the upper graph 500(A) illustrates a first threshold 502(A) associated with the supply voltage. In some embodiments, a server alarm, which may be represented by a triangle with an exclamation point therein, is generated when the supply voltage exceeds the first threshold 502(A). In this manner, in some embodiments, an indication of the server alarm may be displayed to the user/operator on the console display device so that the user/operator may make adjustments to correct for the undesired increase in supply voltage. As shown in FIG. 5, the upper graph 500(A) illustrates two server alarms 504(A)(1) and 504(A)(2) for the supply voltage, indicating two instances of when the supply voltage exceeded the first threshold 502(A).

The lower graph 500(B) in FIG. 5 illustrates an ambient temperature (T) level recorded near the same rack 20 of servers in the data center 10. Although the same rack is measured in this example, another rack and/or racks may be measured instead in some embodiments. In additional embodiments, individual servers and/or components of servers may be measured as well. As illustrated, the dotted line in the lower graph 500(B) illustrates a second threshold 502(B) associated with the ambient temperature surrounding the monitored servers of the data center 10. In some embodiments, a server alarm for the ambient temperature, which may also be represented by a triangle with an exclamation point therein, is generated when the ambient temperature exceeds the second threshold 502(B). Similar to the supply voltage, in some embodiments, an indication of the server alarm for the ambient temperature may be displayed to the user/operator on the console display device so that the user/operator may make adjustments to correct for the undesired increase in temperature. As shown in FIG. 5, the lower graph 500(B) illustrates two server alarms 504(B)(1) and 504(B)(2) indicating two instances of when the ambient temperature exceeded the second threshold 502(B). The lower graph 500(B) also includes an adjusted second threshold 502(B)', which is discussed in further detail below. The lower graph 500(B) also includes a predicted server alarm 508(B), indicated by a diamond with an exclamation point therein, and a combined server alarm 510(B), indicated by a circle with an exclamation point therein. Both the predicted server alarm 508(B) and the combined server alarm 510(B) are discussed in further detail below.

With continuing reference to the flowchart 300 illustrated in FIG. 3, the method performed by the server processing computer 230 for the plurality of monitored servers in the distributed computing system 200 is now described with regard to FIG. 5. In this regard, according to some embodiments, the method includes receiving a server alarm 504(A)(1) of a first type in response to at least one of a first set of server metrics exceeding the first threshold 502(A) (block 302). In some embodiments, each of the first set of server metrics includes a measure of a first property that has been measured for at least one of the plurality of monitored servers. With regard to FIG. 5, the server alarm 504(A)(1) is of a "supply voltage" type and the first set of server metrics are measurements of the supply voltage over a period of time. Thus, when the supply voltage exceeds the first threshold 502(A), the server alarm 504(A)(1) for the supply voltage is received by the server processing computer 230. In some embodiments, the server processing computer 230 may generate the server alarm 504(A)(1) itself in a processing circuit of the server processing computer 230, or the server processing computer 230 may receive the server alarm 504(A)(1) from a different processing component/resource and/or a different computer outside of the distributed computing system 200. The first property, as discussed in block 302, may refer to the supply voltage in some embodiments discussed herein. In this regard, the supply voltage may be measured by a voltmeter at a power supply, or indirectly using any other sensing means.

The method also includes receiving a server alarm 504(B)(1) of a second type in response to at least one of a second set of server metrics exceeding the second threshold 502(B) (block 304). In some embodiments, each of the second set of server metrics includes a measure of a second property that has been measured for at least one of the plurality of monitored servers. With regard to FIG. 5, the server alarm 504(B)(1) is of a "temperature" type and the second set of server metrics are measurements of the ambient temperature over a period of time. Thus, when the temperature exceeds the second threshold 502(B), the server alarm 504(B)(1) for the ambient temperature is received by the server processing computer 230. In some embodiments, the server processing computer 230 may generate the server alarm 504(B)(1) itself in a processing component of the server processing computer 230, or the server processing computer 230 may receive the server alarm 504(B)(1) from a different processing circuit/resource and/or a different computer outside of the distributed computing system 200. The second property, as discussed in block 304, may refer to the ambient temperature surrounding the servers in the data center 10 in some embodiments discussed herein. In this regard, the ambient temperature may be measured by any type of analog and/or digital thermometer in the environment surrounding the monitored servers in the data center 10, or indirectly using any other sensing means.

In some embodiments disclosed herein, the first property and/or the second property may be an operational property associated with the performance and/or the operation of the monitored servers and/or an environmental property associated with the environment surrounding the monitored servers. In some embodiments, an operational property may include memory utilization of the monitored servers, supply voltage associated with the monitored servers, network loading associated with the monitored servers, and throughput associated with the monitored servers. These features are also described above with regard to FIG. 1. In some embodiments, an environmental property may include ambient temperature of the environment surrounding the monitored servers, humidity of the environment surrounding the monitored servers, and/or any other environmental factor which may have an impact on the performance of the servers in the data center 10 and/or the server processing computer 230.

According to some embodiments, once the server processing computer 230 receives the first server alarm 504(B)(1) and the second server alarm 504(B)(2), the method also includes determining a server alarm correlation between the received server alarm of the first type (i.e., server alarm 504(A)(1)) and the received server alarm of the second type (i.e., server alarm 504(B)(1) (block 306). In embodiments disclosed herein, determining a server alarm correlation may include using any type of pattern recognition and/or statistical process related to finding correlations between multiple dynamic systems. For example, with regard to the first server alarm 504(B)(1) and the second server alarm 504(B)(2), the server processing computer 230 may perform a regression analysis using the first set of server metrics and the second set of server metrics (i.e., the measured supply voltage and temperature levels) to determine a value for the server alarm correlation. In this manner, an adherence measurement to a stochastic curve may be determined for at least one of the sets of measured server metrics. Additionally, aspects such as the slope of each curve and/or the change in the slope of each curve over time may be considered in determining the server alarm correlation value.

After the server alarm correlation is determined, the method illustrated in the flowchart 300 of FIG. 3 includes generating a new server alarm configuration for at least one of a server alarm of the first type (e.g., server alarm 504(A)(2)) and a server alarm of the second type (e.g., server alarm 504(B)(2)) based on the server alarm correlation (block 308). According to some embodiments, generating a new server alarm configuration may include a number of additional or sub-operations. In this regard, the flowchart 400 illustrated in FIG. 4 provides a number of additional and/or more detailed embodiments of operations of the method illustrated in FIG. 3.

As illustrated in FIG. 4, generating a new server alarm configuration may include receiving a subsequent server alarm 504(A)(2) of the first type (block 402). With regard to the example illustrated in FIG. 5, the subsequent server alarm 504(A)(2) is received by the server processing computer 230 in response to the supply voltage exceeding the first threshold 502(A).

Before, during, or after the subsequent server alarm 504(A)(2) of the first type is received, the method may also include determining when the server alarm correlation between the received server alarm 504(A)(1) of the first type and the received server alarm 504(B)(1) of the second type satisfies a defined rule (block 404). In this regard, the server alarm correlation value determined in operations discussed above with respect to FIG. 3 may be determined with respect to a value stored in the server processing computer 230. For example, in some embodiments, the defined rule is satisfied when the server alarm correlation value is greater than a correlation value representing a requisite degree of correlation between the received server alarm (504(A)(1) of the first type and the received server alarm 504(B)(1) of the second type. The correlation value representing a requisite degree of correlation between the received server alarm 504(A)(1) of the first type and the received server alarm 504(B)(1) of the second type may be determined via direct programming (i.e., a programmer manually inputting a hard-coded value into the software) and/or through a machine learning process, wherein the correlation value may be altered and/or adjusted in response to changes in the operation and/or surrounding environment of the servers in the data center 10. These machine learning processes are discussed in further detail below.

In some embodiments discussed herein, generating a new server alarm configuration may also include, responsive to having received the subsequent server alarm 504(A)(2) of the first type and having determined that the server alarm correlation satisfies the defined rule, generating a predicted server alarm 508(B) of the second type and/or a combined server alarm 510(B) before receiving a subsequent server alarm 504(B)(2) of the second type. In embodiments where a combined server alarm 510(B) is generated, the combined server alarm 510(B) may represent the subsequent server alarm 504(A)(2) of the first type and the subsequent server alarm 504(B)(2) of the second type.

In additional embodiments, as illustrated in FIG. 4, generating a new server alarm configuration may also include, responsive to having received the subsequent server alarm 504(A)(2) of the first type and having determined that the server alarm satisfies the defined rule, generating a predicted server alarm 508(B) of the second type before receiving a subsequent server alarm 504(B)(2) of the second type (block 406). The method may also include, responsive to having generated the predicted server alarm 508(B), generating a combined server alarm 510(B) before receiving the subsequent server alarm 504(B)(2) of the second type (block 408). In some embodiments, the combined server alarm 510(B) represents the subsequent server alarm 504(A)(2) of the first type and the predicted server alarm 508(B) of the second type (block 408). In some embodiments, the method includes not displaying either the subsequent server alarm 504(A)(2) of the first type, the subsequent server alarm 504(B)(2) of the second type, or the predicted server alarm 508(B) to a user/operator accessing the server processing computer 230, and displaying the combined server alarm 510(B) to the user/operator accessing the server processing computer 230. In yet other embodiments, the method includes not displaying either the subsequent server alarm 504(A)(2) of the first type or the subsequent server alarm 504(B)(2) of the second type to a user/operator accessing the server processing computer 230, and displaying the predicted server alarm 508(B) to the user/operator accessing the server processing computer 230.

By generating the predicted server alarm 508(B) and/or the combined server alarm 510(B), several benefits may be recognized. For example, operators of the server processing computer 230 may suffer from alarm fatigue, wherein the receiving of too many server alarms can result in an operator ignoring and/or missing server alarms as a result of operator fatigue. Thus, by replacing multiple server alarms being displayed with a the combined server alarm being displayed, the number of alarms displayed to the operator may be reduced by a factor of two or more. In this manner, the operator may be less fatigued, and therefore may become more responsive to the server alarms, thereby increasing the overall operational efficiency of the operation of the data center 10.

In a similar vein, the predicted server alarm 508(B) may allow an operator to respond to a server condition indicated by the server alarm at an earlier time, thereby reducing the potential for negative issues to arise and/or propagate. For example, with regard to FIG. 5, after performing the operations of the method discussed above, a database processing computer 230 may determine that the ambient temperature is sufficiently correlated to the supply voltage. In some scenarios, based on an operational history represented by the server metrics, it may be determined that an increase in the supply voltage results in an increase in dissipated power. In this regard, the dissipated power may result in an increase in temperature. In a conventional system, an operator may receive a server alarm for the supply voltage increase and a server alarm for the temperature increase separately. However, by determining the sufficiency of the correlation between the supply voltage and the ambient temperature, as discussed above, a single predicted server alarm may be provided in response to the supply voltage increasing at a recognized rate and to a certain extent. For example, as illustrated in FIG. 5, if the supply voltage goes past the first threshold 502(A) and remains above the first threshold 502(A) for a given period of time, the resulting power dissipation may increase the ambient temperature of the data center 10 to an unacceptable and/or undesirable level. However, if the predicted server alarm 508(B) is generated and displayed to the operator before the subsequent server alarm 504(B)(2), then the operator may correct the increased ambient temperature before it becomes an issue. By taking such early actions, the data center 10 may operate more efficiently and with less error than in a conventional scenario. Thus, in embodiments discussed herein, data centers may operate more efficiently and with fewer errors than in conventional structures.

Since the predicted server alarm 508(B) is an additional server alarm that may contribute to the alarm fatigue of the operator, the server processing computer 230 may temper the number of alarms by replacing the display of the predicted server alarm 508(B) with the display of the combined server alarm 510(B), as noted above. In this manner, the need for earlier alarms may be balanced with the need for avoiding alarm fatigue for the operator of the data center.

In addition to providing the predicted server alarm 508(B) and the combined server alarm 510(B), methods discussed herein are directed to adjusting the threshold associated with the varying metrics so as to further increase and narrowly tailor the accuracy and precision of the database processing computer 230 with regard to providing incorrect predictions. In this manner, as described in FIG. 4, methods discussed herein may include receiving the subsequent server alarm 504(B)(2) of the second type, and determining a subsequent server alarm correlation between the received subsequent server alarm 504(A)(2) of the first type and the received subsequent server alarm of the second type 504(B)(2) (blocks 410 and 412). The operations performed in blocks 410 and 412 may include any relevant of the operations discussed above, such as those discussed with regard to block 402 and 404.

Once the subsequent server alarm correlation is determined, the server processing computer 230 may determine a difference between the server alarm correlation and the subsequent server alarm correlation (block 414). In this regard, a number of statistical techniques, like those discussed above, may be used to determine and/or calculate the difference between the server alarm correlation and the subsequent server alarm correlation. Once the difference is determined, the server processing computer 230 may adjust the second threshold 502(B) associated with the second property at at least one of the plurality of servers based on the determined difference between the server alarm correlation and the subsequent server alarm correlation (block 416). In this manner, the second threshold 502(B) may be adjusted to become the adjusted second threshold 502(B)' illustrated in FIG. 5.

In at least one embodiment, determining the difference between the server alarm correlation and the subsequent server alarm correlation includes determining a degree to which the received server alarm 504(A)(1) of the first type and the received server alarm 504(B)(1) of the second type are more/less correlated than the received subsequent server alarm 504(A)(2) of the first type and the received subsequent server alarm 504(B)(2) of the second type. In such embodiments, adjusting the second threshold 502(B) associated with the second property at at least one of the plurality of servers based on the determined difference between the server alarm correlation and the subsequent server alarm correlation includes increasing/reducing the second threshold associated with the second property at at least one of the plurality of servers based on the determined degree.

By adjusting the second threshold 502(B) to a lower level, as illustrated by the adjusted second threshold 502(B)' illustrated in FIG. 5, the server processing computer 230 may provide earlier server alarms to an operator and/or to the server processing computer 230 in future server alarm events. In this manner, the adjusted second threshold 502(B)' may allow an operator to respond to a server condition indicated by the server alarm at an earlier time, thereby reducing the potential for negative issues to arise and/or propagate. In contrast to reducing the second threshold 502(B) to a lower level, increasing the second threshold 502(B) to a higher level (although not shown in FIG. 5) may help in reducing the number of false alarms. In this manner, alarm fatigue may be reduced. In additional embodiments, any relevant machine learning and/or artificial intelligence algorithm may be used to enable this form of feedback. Thus, in this manner, embodiments discussed herein may be beneficial in both reducing false alarms and/or alarm fatigue and/or reducing the potential for negative issues to arise and/or propagate.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method performed by a server processing computer for a plurality of monitored servers, the method comprising:
   receiving a server alarm of a first type in response to at least one of a first set of server metrics exceeding a first threshold, wherein each of the first set of server metrics comprises a measure of a first property that has been measured for at least one of the plurality of monitored servers;
   receiving a server alarm of a second type in response to at least one of a second set of server metrics exceeding a second threshold, wherein each of the second set of server metrics comprises a measure of a second property that has been measured for at least one of the plurality of monitored servers;

determining a server alarm correlation between the received server alarm of the first type and the received server alarm of the second type;

receiving a subsequent server alarm of the first type;

determining the server alarm correlation satisfies a defined rule, wherein the defined rule is satisfied when the server alarm correlation is greater than a correlation value representing a requisite degree of correlation between the received server alarm of the first type and the received server alarm of the second type;

responsive to having received the subsequent server alarm of the first type and having determined that the server alarm correlation satisfies the defined rule, generating a predicted server alarm of the second type before receiving the subsequent server alarm of the second type; and generating a new server alarm configuration for at least one of the server alarm of the first type, the server alarm of the second type, and the subsequent server alarm of the first type based on the server alarm correlation.

2. The method of claim 1, further comprising:
receiving the subsequent server alarm of the second type;
determining a subsequent server alarm correlation between the received subsequent server alarm of the first type and the received subsequent server alarm of the second type;
determining a difference between the server alarm correlation and the subsequent server alarm correlation; and
adjusting the second threshold associated with the second property at least one of the plurality of servers based on the determined difference between the server alarm correlation and the subsequent server alarm correlation.

3. The method of claim 2, wherein:
determining the difference between the server alarm correlation and the subsequent server alarm correlation comprises:
determining a degree to which the received server alarm of the first type and the received server alarm of the second type are less correlated than the received subsequent server alarm of the first type and the received subsequent server alarm of the second type; and
adjusting the second threshold associated with the second property at least one of the plurality of servers based on the determined difference between the server alarm correlation and the subsequent server alarm correlation comprises:
reducing the second threshold associated with the second property at least one of the plurality of servers based on the determined degree.

4. The method of claim 2, wherein:
determining the difference between the server alarm correlation and the subsequent server alarm correlation comprises:
determining a degree to which the received server alarm of the first type and the received server alarm of the second type are more correlated than the received subsequent server alarm of the first type and the received subsequent server alarm of the second type; and
adjusting the second threshold associated with the second property at least one of the plurality of servers based on the determined difference between the server alarm correlation and the subsequent server alarm correlation comprises:
increasing the second threshold associated with the second property at least one of the plurality of servers based on the determined degree.

5. The method of claim 1, wherein generating a new server alarm configuration comprises:
responsive to having received the subsequent server alarm of the first type and having determined that the server alarm correlation satisfies the defined rule, generating a combined server alarm before receiving a subsequent server alarm of the second type, wherein the combined server alarm represents the subsequent server alarm of the first type and the subsequent server alarm of the second type.

6. The method of claim 5, further comprising:
receiving the subsequent server alarm of the second type;
determining a subsequent server alarm correlation between the received subsequent server alarm of the first type and the received subsequent server alarm of the second type;
determining a difference between the server alarm correlation and the subsequent server alarm correlation; and
adjusting the second threshold associated with the second property at least one of the plurality of servers based on the determined difference between the server alarm correlation and the subsequent server alarm correlation.

7. The method of claim 6, further comprising:
not displaying either the subsequent server alarm of the first type or the subsequent server alarm of the second type to a user accessing the server processing computer; and
displaying the combined server alarm to the user accessing the server processing computer.

8. The method of claim 6, wherein:
determining the difference between the server alarm correlation and the subsequent server alarm correlation comprises:
determining a degree to which the received server alarm of the first type and the received server alarm of the second type are less correlated than the received subsequent server alarm of the first type and the received subsequent server alarm of the second type; and
adjusting the second threshold associated with the second property at least one of the plurality of servers based on the determined difference between the server alarm correlation and the subsequent server alarm correlation comprises:
reducing the second threshold associated with the second property at least one of the plurality of servers based on the determined degree.

9. The method of claim 6, wherein:
determining the difference between the server alarm correlation and the subsequent server alarm correlation comprises:
determining a degree to which the received server alarm of the first type and the received server alarm of the second type are more correlated than the received subsequent server alarm of the first type and the received subsequent server alarm of the second type; and
adjusting the second threshold associated with the second property at least one of the plurality of servers based on the determined difference between the server alarm correlation and the subsequent server alarm correlation comprises:
increasing the second threshold associated with the second property at least one of the plurality of servers based on the determined degree.

10. The method of claim 1, wherein generating a new server alarm configuration comprises:
responsive to having received the subsequent server alarm of the first type and having determined that the server alarm correlation satisfies the defined rule, generating a predicted server alarm of the second type before receiving a subsequent server alarm of the second type; and
responsive to having generated the predicted server alarm, generating a combined server alarm before receiving the subsequent server alarm of the second type, wherein the combined server alarm represents the subsequent server alarm of the first type and the predicted server alarm.

11. The method of claim 10, further comprising:
receiving the subsequent server alarm of the second type;
determining a subsequent server alarm correlation between the received subsequent server alarm of the first type and the received subsequent server alarm of the second type;
determining a difference between the server alarm correlation and the subsequent server alarm correlation; and
adjusting the second threshold associated with the second property at least one of the plurality of servers based on the determined difference between the server alarm correlation and the subsequent server alarm correlation.

12. The method of claim 11, further comprising:
not displaying either the subsequent server alarm of the first type, the subsequent server alarm of the second type, or the predicted server alarm to a user accessing the server processing computer; and
displaying the combined server alarm to the user accessing the server processing computer.

13. The method of claim 11, wherein:
determining the difference between the server alarm correlation and the subsequent server alarm correlation comprises:
determining a degree to which the received server alarm of the first type and the received server alarm of the second type are less correlated than the received subsequent server alarm of the first type and the received subsequent server alarm of the second type; and
adjusting the second threshold associated with the second property at least one of the plurality of servers based on the determined difference between the server alarm correlation and the subsequent server alarm correlation comprises:
reducing the second threshold associated with the second property at least one of the plurality of servers based on the determined degree.

14. The method of claim 11, wherein:
determining the difference between the server alarm correlation and the subsequent server alarm correlation comprises:
determining a degree to which the received server alarm of the first type and the received server alarm of the second type are more correlated than the received subsequent server alarm of the first type and the received subsequent server alarm of the second type; and
adjusting the second threshold associated with the second property at least one of the plurality of servers based on the determined difference between the server alarm correlation and the subsequent server alarm correlation comprises:
increasing the second threshold associated with the second property at least one of the plurality of servers based on the determined degree.

15. The method of claim 1, wherein:
one of the first property and the second property comprises an operational property associated with the performance and/or the operation of the monitored servers; and
another of the first property and the second property comprises an environmental property associated with the environment surrounding the monitored servers.

16. The method of claim 15, wherein:
the operational property comprises one of memory utilization of the monitored servers, supply voltage associated with the monitored servers, network loading associated with the monitored servers, and throughput associated with the monitored servers; and
the environmental property comprises one of ambient temperature of the environment surrounding the monitored servers and humidity of the environment surrounding the monitored servers.

17. The method of claim 1, wherein generating the new server alarm configuration is generated for each of the server alarm of the first type, the server alarm of the second type, and the subsequent server alarm of the first type based on the server alarm correlation.

18. The method of claim 17, wherein the new server alarm configuration is further generated for the predicted server alarm of the second type.

19. The method of claim 1, wherein generating the new server alarm configuration for at least one of the server alarm of the first type, the server alarm of the second type, and the subsequent server alarm of the first type further includes the predicted server alarm of the second type.

20. The method of claim 1, further comprising causing to display the predicted server alarm of the second type via a graphical alarm indication.

* * * * *